July 3, 1951

J. O. WOODWORTH 2,559,142

SHORT TURN STEERING MECHANISM

Filed Oct. 9, 1948

Inventor:
John O. Woodworth
By Hinkle, Horton, Ahlberg, Hansmann & Kupper
Attorneys.

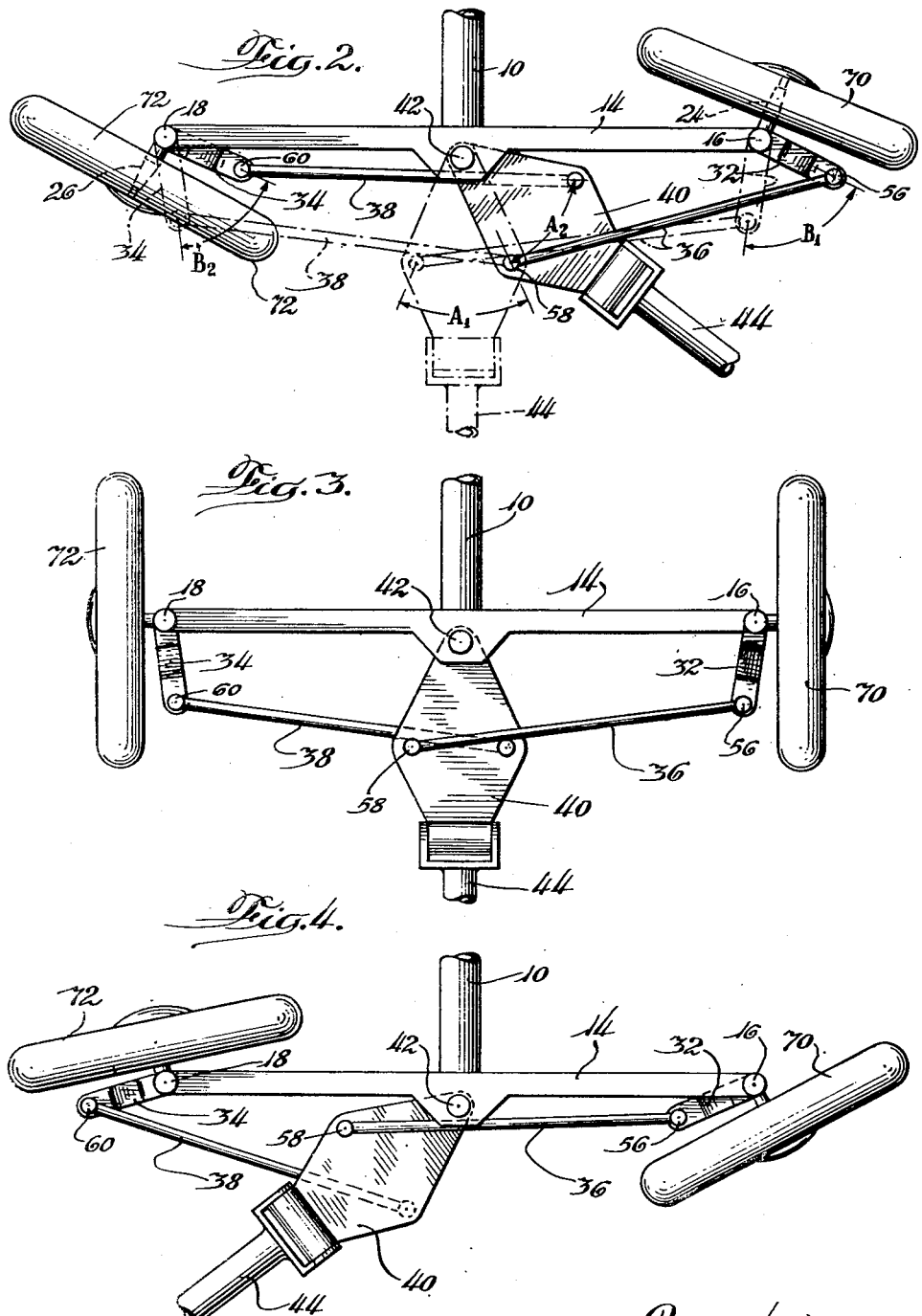

Patented July 3, 1951

2,559,142

UNITED STATES PATENT OFFICE 2,559,142

SHORT TURN STEERING MECHANISM

John O. Woodworth, La Grange, Ind.

Application October 9, 1948, Serial No. 53,662

1 Claim. (Cl. 280—103)

This invention relates generally to improvements in vehicle steering mechanisms and more particularly to a new and improved steering mechanism for front steering four-wheeled vehicles of both the self-propelled and trailer or wagon type.

An object of the invention is to provide a steering mechanism for wagons and the like wherein said mechanism and said steering is forward of and in line with the front axle.

Another object of the invention is to provide a steering mechanism of the character described which enables the vehicle to be turned within a very short turning radius.

Another object of the invention is to provide a steering mechanism which maintains correct wheel alignment regardless of the angle of turn and wherein the inside wheel on any turn follows the inside path of less turning radius without skidding.

It is a further object of the invention to provide a steering mechanism of the character described which is simple and strong and which lends itself to the desirable trailing and turning requirements of agricultural vehicles. For example, the present modification of the invention is directed to a steering mechanism for farm wagons of the type having a towing bar for attachment to a tractor or other prime mover. The primary functional requirements of this type of farm wagon is that it have towing maneuverability through an angle of turn approaching 90° to the straight line of draft without coming to a dead center and wherein the wheels will return to their normal positions of alignment for straight line towing. Heretofore, these towing requirements have in part been met by the utilization of various modifications of the conventional "auto-steer" type of steering mechanism with the resulting disadvantageous loss of clearance between the ground and steering structure which can only be overcome by raising the entire wagon structure, which is not desirable. The other type of front wheel steering commonly used with farm wagons and other trailing vehicles is the so-called "fifth-wheel" steering wherein the front axle is centrally pivoted to the underside of the wagon bed and the front wheels are mounted on non-turnable spindles at the ends of the axle, steering being accomplished by directional pull on a wagon tongue extending forwardly from the center of the axle and fixed at right angle therewith. While this type of steering is perhaps the simplest in construction, it has the important inherent disadvantage that one or the other of the front wheels always skids on turns, thereby greatly increasing the wear on the front tires. It is the object of this invention to provide a steering mechanism having all of the advantages which are obtained from the conventional "auto-steer" and the "fifth-wheel" types of steering mechanisms without the accompanying disadvantages.

The manner in which the present invention accomplishes the foregoing and such other objects will be clearly brought out in the description to follow in the course of which reference will be had to the accompanying drawings, in which:

Figs. 2, 3 and 4 are diagrammatic top elevational views of the axle and steering mechanism in three different positions.

In the various views of the drawings, like characters of reference designate corresponding parts.

Figure 1:
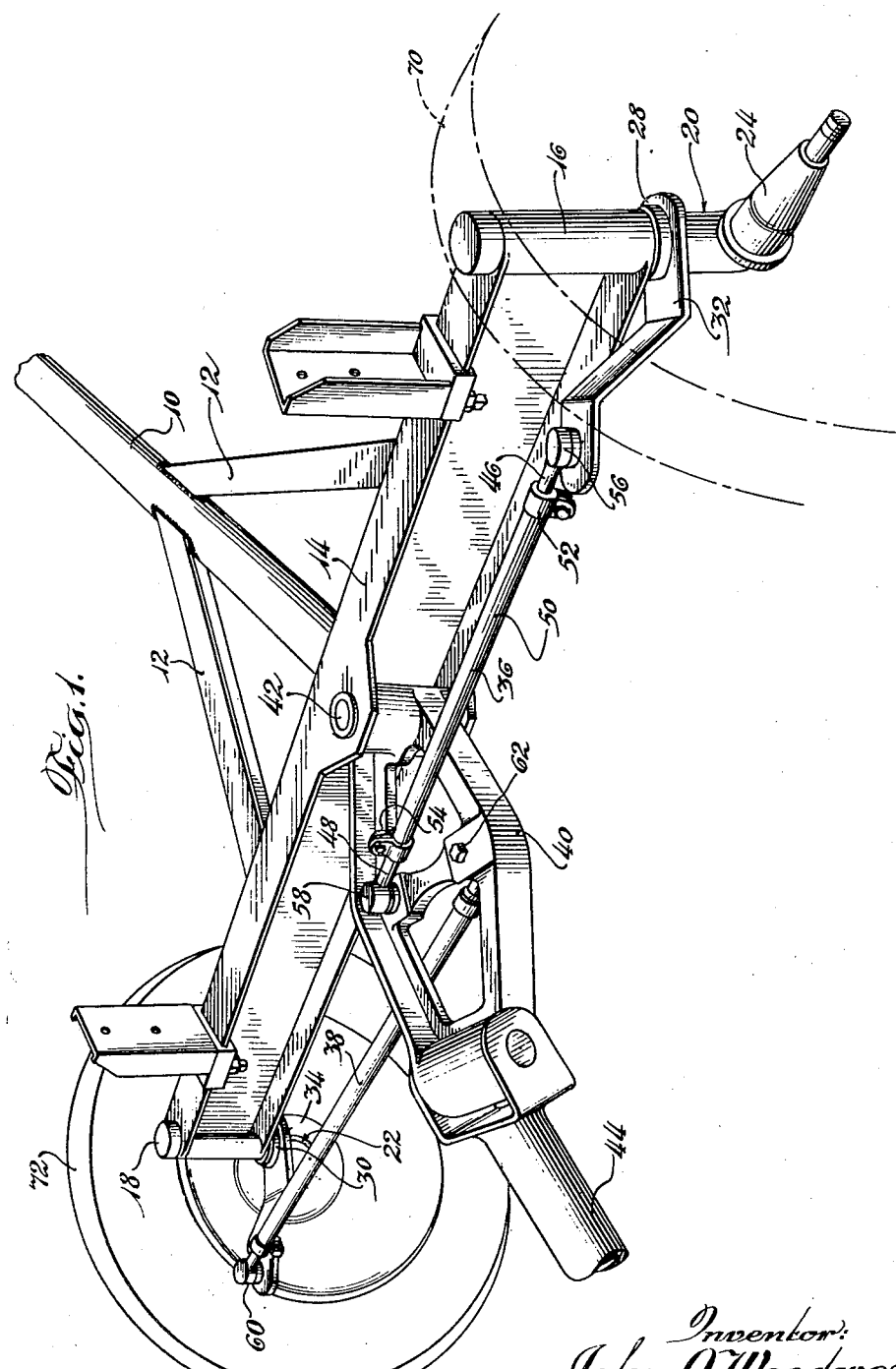
Fig. 1 is a perspective view of the front portion of a wagon structure, including the detailed assembly of the improved steering mechanism embodied in the present invention.

Referring to Fig. 1, there is shown the front axle assembly of a four-wheeled flat bed farm tow wagon embodying the present invention. Essentially, the front axle construction comprises a longitudinal tubular wagon frame member 10 centrally secured and braced to a transverse front axle-tree 14 by the supporting angle iron struts 12, 12. The axle-tree 14 is essentially a standard I-beam provided with kingpin bearings 16 and 18 at either end thereof upon which the stub axle assemblies 20 and 22 are pivotally mounted for turning on an axis substantially perpendicular to the axis of rotation of the wheel. Permanently secured to the spindle members 24 and 26 intermediate the elbows thereof and the bearing flanges 28 and 30 are steering arms 32 and 34 projecting forward and inwardly at a preferred angle of 95° with the axis of the respective wheel spindles 24 and 26 and movable as a unit with the stub axle assemblies 20 and 22. These steering arms have an upwardly slanting bias intermediate the ends thereof such that the outward ends are disposed for movement in a plane perpendicular to that of the turning axis of the kingpins 16 and 18 and above the bottom flange of the transverse axle-tree 14, the left-hand steering arm being raised slightly higher in this dimension than the right-hand steering arm to allow for clearance of the over-lapping tie rods 36 and 38 as will presently be more clearly described.

The new and improved steering mechanism to which the present invention is directed resides primarily in the diamond-shaped member 40, Figs. 1, 2, 3 and 4, which may be described as a quadrant having one end pivoted at 42 to the center of the axle-tree 14 and extending outwardly therefrom for horizontal movement and a tow bar 44 horizontally pivoted at the outer end thereof for vertical movement whereby universal movement between said tow bar and the axle is provided. While the quadrant member 40 is represented in the drawings as being substantially diamond-shaped, it is to be understood that said member can be of any other shape which provides for a major axis and a centrally located minor axis at right angles to the major axis, for example an ellipse or a cross.

The quadrant member 40 is connected with the steering arms 32 and 34 by the tie rods 36 and 38. As shown in Fig. 1, the tie rods 36 and 38 are of the adjustable turn-buckle type having oppositely threaded male parts 46 and 48 and an internally threaded connecting link or barrel 50 provided with locking collars 52 and 54 at the ends thereof for locking the tie rod at the adjusted length of correct wheel alignment.

The tie rod 36 from the left side of the wagon is pivoted to the outer end of the left steering arm 32 at 56, the other end of which is pivoted to the right side of the quadrant member 40 at 58. The right tie rod 38 is similarly pivoted to the right steering arm at 60 and is pivoted at its inner end to the quadrant member 40 at the left side thereof at 62. As shown in the drawings, with this arrangement the right and left tie rods 36 and 38 have their inner ends crossed to opposite sides of the quadrant plate 40, and spaced further forward of the transverse axle 14 than their outer ends. In order that the rods will not interfere with one another, the left tie rod 36 is pivoted to the upperside of the quadrant member 40 and the right tie rod 38 is pivoted on the underside of said quadrant member. The steering arms 32 and 34 to which the outer ends of the tie rods 36 and 38 are connected are of different biased lengths corresponding to the spaced relation of the tie rods at their inner ends, both of which are sufficiently raised upwardly by said biases to position the tie rods in parallel planes above the bottom line of the axle-tree 14.

Referring to the diagrammatic Figure 2, it is seen that when the tow bar 44 is pulled to the left, the quadrant member 40 pivots about the pivot point 42 moving the inner end of the left tie rod 36 through the arc A₁, and the inner end of the right tie rod 38 through the arc A₂ with the result that the left steering arm 32 is moved through the arc B₁ while the right steering arm 34 moves through a smaller arc B₂, with the combined result that the left-hand or inside wheel 70 is given a sharper angle of turn than the right-hand or outside wheel 72, thereby providing the outside wheel 72 with a greater radius of rotation about the axis of turn of the wagon to eliminate the skidding of either wheel on the turns. The unique feature of this arrangement lies in the fact that each wheel in effect turns independently of the other in that the distance between the outward ends of the steering arms 32 and 34 increases with the degree of turn, thus causing the inside wheel to always turn in a smaller radius than that of the outside wheel.

Another important feature of this arrangement resides in the fact that extremely short turns may be accomplished without the steering arms 32, 34 and the tie rods 36, 38 coming into a straight line locking position, the inner ends of said tie rods always being maintained further from the axle than the outer ends thereof, whereby the wheels are always returnable to their straight ahead positions of alignment by a straight ahead pull on the tow bar 44 as shown in Fig. 3.

Fig. 4 shows the wagon being turned to the right under which condition the right-hand wheel 72 has been turned through a greater angle than the left-hand wheel 70 to further illustrate the manner in which the inside wheel on a right or left turn will always turn in a smaller radius than the outside wheel.

While it is not shown in the diagrammatic Figs. 2, 3 and 4, in practice it is preferred to provide a camber to each of the front wheels whereby the bottom of the wheels are slightly closer together than tops thereof such that when the wagon or other vehicle is loaded the tendency will be to straighten up the wheels. This camber effect is usually provided by placing the kingpin mountings 16 and 18 at a slight angle with the transverse axle-tree 14. Likewise, it is the practice to provide the front wheels with a slight "toe-in" whereby the forward part of the wheels are slightly closer together than the rear portions thereof such that the two steerable wheels are in effect working against each other with the result that the vehicle will always seek a straight ahead line of travel. In the present invention, this "toe-in" effect may readily be accomplished by shortening the adjustable tie rods 36 and 38.

From the foregoing description, those familiar with the art of auto steering mechanisms will recognize that the novel arrangement of the steering arms 32, 34, the tie rods 36, 38 and the steering quadrant 40 disclosed herein, the subject of the present application, differs from the prior art in that here all of such members are positioned in front of and above the bottom line of the transverse main axle rather than behind and below the transverse axle. This feature has the important advantage of rendering the tie rods less vulnerable to contact with ground obstructions encountered in the use of farm vehicles. Another distinguishing feature of this arrangement is the overlapping of the tie rods and the quadrant member 40 in association with the tow bar or steering member 44, which unique arrangement provides for efficiency and a high degree of maneuverability in towing and steering as hereinbefore described.

While a specific embodiment of my invention has been described and illustrated herein, it should be understood that the same may be varied, within the scope of the appended claim, without departing from the spirit of the invention.

I claim:

A vehicle steering mechanism comprising an axle-tree secured to a longitudinal member, right and left wheel spindles pivotally mounted at either end of the axle-tree, right and left upwardly biased steering arms associated with each of said wheel spindles extending forwardly and inwardly therefrom and turnable as a unit therewith, a diamond-shaped member having a major axis and a minor axis, said diamond-shaped member being pivoted at one end of its major axis to the center of the forward part of said axle-tree for horizontal movement, a tow bar pivoted for vertical movement at the other end of the major axis of said diamond-shaped member, two straight substantially equal length right and left longitudinally adjustable tie rods extending between said diamond-shaped member and said right and left steering arms, means pivotally connecting said right and left tie rods to said right and left steering arms, respectively, said left tie rod member being pivoted to the top side of said diamond-shaped member at a point along its minor axis to the right of its major axis, and said right tie rod being pivoted to the bottom of said member at a point along its minor axis to the left of its major axis, whereby said right and left tie rods are crossed and spaced vertically at their inner ends and whereby the inner ends of said right and left tie rods are disposed farther forward of said axle-tree than the outer ends thereof.

JOHN O. WOODWORTH.

REFERENCES CITED

The following references are of record in the file of this patent:

UNITED STATES PATENTS

| Number | Name | Date |
|---|---|---|
| 358,395 | Hornbeck | Feb. 22, 1887 |
| 843,691 | McIntosh | Feb. 12, 1907 |
| 935,874 | Wilcox | Oct. 5, 1909 |
| 1,379,982 | Hartsock | May 31, 1921 |
| 1,522,706 | Allen | Jan. 13, 1925 |
| 2,047,206 | Knapp | July 14, 1936 |
| 2,107,384 | McQueen | Feb. 8, 1938 |
| 2,135,227 | Voorhees | Nov. 1, 1938 |

FOREIGN PATENTS

| Number | Country | Date |
|---|---|---|
| 287,067 | Germany | Sept. 11, 1915 |
| 865,139 | France | May 14, 1941 |